US007496757B2

(12) United States Patent
Abbott et al.

(10) Patent No.: US 7,496,757 B2
(45) Date of Patent: Feb. 24, 2009

(54) SOFTWARE VERIFICATION SYSTEM, METHOD AND COMPUTER PROGRAM ELEMENT

(75) Inventors: Paul Harry Abbott, Stockbridge (GB); Lawrence Koved, Pleasantville, NY (US); Anthony Joseph Nadalin, Austin, TX (US); Marco Pistoia, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 790 days.

(21) Appl. No.: 10/050,083

(22) Filed: Jan. 14, 2002

(65) Prior Publication Data

US 2003/0135746 A1 Jul. 17, 2003

(51) Int. Cl.
*G06F 21/00* (2006.01)
(52) U.S. Cl. .................. 713/176; 713/164; 713/165; 713/194
(58) Field of Classification Search .......... 713/176, 713/2, 164–6, 187; 719/331–3
See application file for complete search history.

(56) References Cited

U.S. PATENT DOCUMENTS

| | | | | |
|---|---|---|---|---|
| 5,421,006 A | * | 5/1995 | Jablon et al. | 714/36 |
| 5,757,914 A | * | 5/1998 | McManis | 713/187 |
| 5,915,085 A | * | 6/1999 | Koved | 713/200 |
| 5,916,308 A | * | 6/1999 | Duncan et al. | 719/331 |
| 5,970,145 A | * | 10/1999 | McManis | 713/187 |
| 5,970,252 A | * | 10/1999 | Buxton et al. | 717/166 |
| 5,991,774 A | * | 11/1999 | Tate et al. | 707/203 |
| 6,070,239 A | * | 5/2000 | McManis | 713/187 |
| 6,078,909 A | * | 6/2000 | Knutson | 705/59 |
| 6,151,703 A | * | 11/2000 | Crelier | 717/136 |
| 6,157,721 A | * | 12/2000 | Shear et al. | 380/255 |
| 6,546,487 B1 | * | 4/2003 | McManis | 713/169 |
| 6,651,186 B1 | * | 11/2003 | Schwabe | 714/38 |
| 6,802,006 B1 | * | 10/2004 | Bodrov | 713/187 |
| 6,865,742 B1 | * | 3/2005 | Khare et al. | 719/331 |
| 2004/0139342 A1 | * | 7/2004 | Aho et al. | 713/200 |
| 2005/0251682 A1 | * | 11/2005 | Collins et al. | 713/176 |
| 2006/0064576 A1 | * | 3/2006 | Chen | 713/2 |
| 2007/0143629 A1 | * | 6/2007 | Hardjono et al. | 713/189 |
| 2007/0198841 A1 | * | 8/2007 | Lundblade et al. | 713/176 |

OTHER PUBLICATIONS

Menezes et al., Handbook of Applied Cryptography, 1997, CRC Press, pp. 543-550.*

(Continued)

*Primary Examiner*—Emmanuel L. Moise
*Assistant Examiner*—Jeffery Williams
(74) *Attorney, Agent, or Firm*—Harrington & Smith, PC

(57) ABSTRACT

A software security system is arranged to verify the authenticity of each element of a Java Virtual Machine installation. A digital signature is attached to each file of the JVM installation. A loader (20) verifies the digital signature of the JVM DLL (30). The JVM DLL 30 then verifies the digital signature of each other DLL and configuration file to be loaded (40, 50, 60, 70), and only loads those files which have successfully verified digital signatures. In this way the security of the JVM is enhanced, a user has greater confidence that the Java applications will function correctly, and the detection of incorrect or damaged JVM installations is improved.

13 Claims, 2 Drawing Sheets

OTHER PUBLICATIONS

Fong et al., "Proof Linking: An Architecture for Modular Verification of Dynamically-Linked Mobile Code", 1998, ACM.*

Koved et al., "The Evolution of Java Security", 1998, IBM.*

Microsoft Computer Dictionary, 4th ed., Microsoft Press, 1999, p. 242.*

Microsoft Press Computer Dictionary, 3rd ed., 1997, Microsoft Press, p. 287.*

Microsoft Computer Dictionary, 5th ed., 2002, Microsoft Press, p. 93.*

W.A. Arbaugh, D.J. Farber, J.M. Smith, "A secure and reliable bootstrap architecture," Security and Privacy, IEEE Symposium on, vol. 0, No. 0, pp. 0065, 1997 IEEE Symposium on Security and Privacy, 1997.*

* cited by examiner

SOFTWARE VERIFICATION SYSTEM, METHOD AND COMPUTER PROGRAM ELEMENT

FIELD OF THE INVENTION

This invention relates to security measures in computer software, and particularly but not exclusively to security verification of Java Virtual Machines.

BACKGROUND OF THE INVENTION

In the field of this invention it is known that 'Java 2' includes a significantly enhanced security model, compared to previous Java Virtual Machines (JVMs). This new model can restrict the behaviour of a Java applet or application to a clearly defined set of safe actions. This allows a user to download application code from the internet or across a computer network, and run the code in a previously installed JVM. The user can be confident that the application will be assigned the required privileges to function correctly, but to neither damage the user's machine nor divulge sensitive information held on that machine to others via the network or internet.

However, a problem with this approach is that the JVM itself must retain its security integrity in order to ensure downloaded code is restricted in this way. If a malicious user (hacker) has been able to gain access to the user's machine outside of the JVM environment and alter the behaviour of the JVM the whole Java security model is undermined.

For example, the hacker could alter the privileges assigned for software code from a specific source, thereby allowing subsequently downloaded code from this source to function beyond the limits otherwise set by the JVM, and such enhanced privileges could easily be configured to compromise the security integrity of the user's machine.

Similarly, the hacker could disable the security code altogether, or worst still insert destructive routines into the core of the JVM which could be activated by an external trigger, such as specific time/date, or when other (possibly harmless) code is being executed.

It is clear that with this malicious activity, early detection of such a compromise of the JVM core would be very useful, and could prevent more serious subsequent damage.

If a malicious user decides to attack a machine, the JVM is an obvious target due to its significance in relation to web-based applications, servers and the like. Therefore the security integrity of the JVM is a highly significant factor in the security of the computer as a whole.

A need therefore exists for a software verification system, method and computer program element wherein the above-mentioned disadvantages may be alleviated.

STATEMENT OF INVENTION

In accordance with a first aspect of the present invention there is provided a verification system for a computer software installation having a primary library file, the primary library file having a digital signature; a loader program arranged to obtain a digital signature key and further arranged to load the primary library file, wherein, if a public key cannot be obtained via an internet site of a virtual machine provider, the digital signature key is a hidden public key internal to the loader program and, if a public key can be obtained via the internet site of the virtual machine provider, the digital signature key is the public key obtained via the internet site of the virtual machine provider; and a plurality of secondary files arranged to be referenced by the primary library file, each of the plurality of secondary files having a digital signature; wherein the loader program is arranged to verify and selectively load the primary library file by comparing the obtained digital signature key with the digital signature of the primary library file, the primary library file being further arranged to subsequently verify and selectively load the plurality of secondary files by calling the loader program to compare the obtained digital signature key with the digital signature of each of the plurality of secondary files, wherein the computer software installation is a virtual machine installation.

In accordance with a second aspect of the present invention there is provided a verification method for a computer software installation including launching a loader program arranged to load files; if a public key is available from an internet site of a virtual machine provider, using the public key as a digital signature key; if a public is not available from the internet site of the virtual machine provider, using a hidden key as the digital signature key; using the loader program to verify the authenticity of a digital signature incorporated in a primary library file by comparing said digital signature with the digital signature key; selectively loading the primary library file in dependence upon the successful verification of its digital signature; using the primary library file and the loader program to verify the authenticity of digital signatures incorporated in each of a plurality of secondary files by comparing them with the digital signature key; and, selectively loading the plurality of secondary files in dependence upon the successful verification of their digital signatures, wherein the computer software installation is a virtual machine installation.

Preferably the plurality of files include at least one tertiary file referenced by at least one secondary file of the plurality of secondary files, wherein after successful verification and selective loading of the at least one secondary files, the at least one secondary file is then used to manage the verification and selective loading of the at least one tertiary file.

The digital signature key is preferably a public key obtained via the internet. Alternatively, the digital signature key is preferably a hidden public key internal to the loader program, the loader program being arranged to use the hidden public key in the event that a public key cannot be obtained via the internet.

Preferably the digital signature key comprises a number of keys including a private key provided by an administrator, wherein the plurality of files includes at least one administrator-configurable file, wherein the loader program is further arranged to verify the digital signature of the at least one administrator-configurable file using the private key.

The software installation is preferably a Java Virtual Machine installation.

In this way a software verification system, method and computer program element are provided in which the security of the JVM is enhanced, a user has greater confidence that the Java applications will function correctly, and the detection of incorrect or damaged JVM installations is improved.

BRIEF DESCRIPTION OF THE DRAWINGS

One software verification system, method and computer program element incorporating the present invention will now be described, by way of example only, with reference to the accompanying drawings, in which.

DESCRIPTION OF PREFERRED EMBODIMENT(S)

Figure 1:
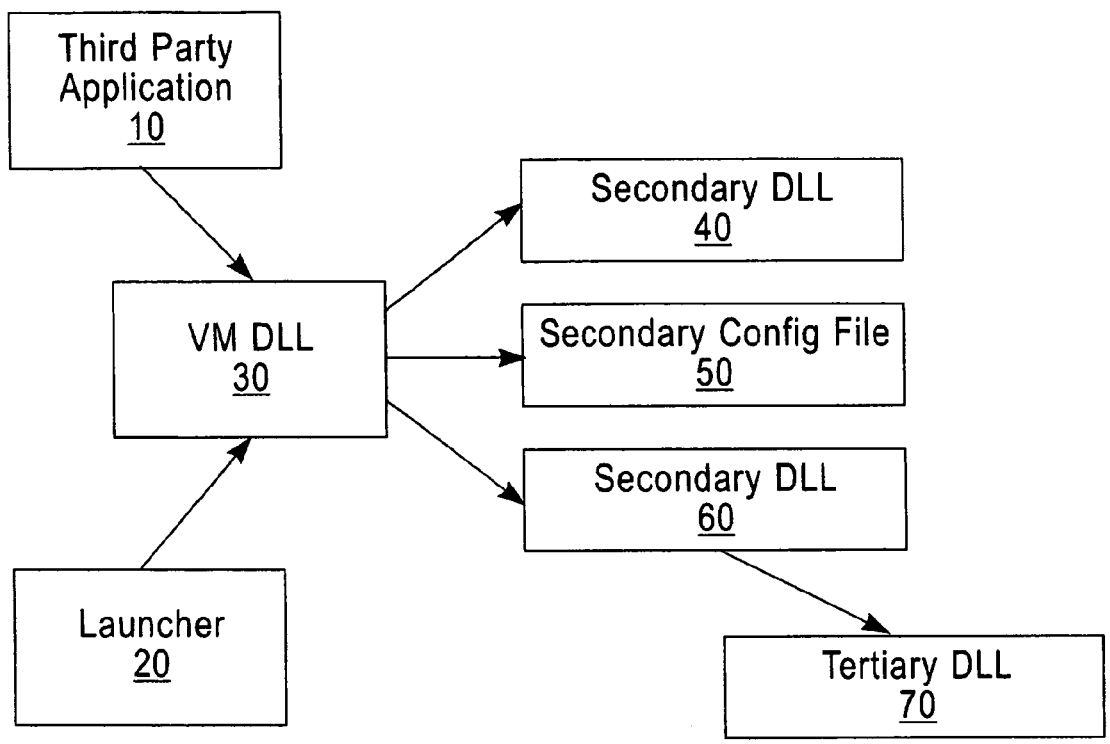
FIG. 1 shows an illustrative block diagram of a security methodology for files of a Java 2 software environment, in accordance with the present invention; and, FIG. 2 shows an illustrative flow chart of a security procedure for the files of FIG. 1.

Referring to FIG. 1, there is shown an illustrative block diagram of computer software files associated with a Java Virtual Machine (JVM®) installation, such as Java 2. Java is a high level, object oriented programming language developed especially for web applications. A Java Virtual Machine is a virtual machine that runs Java® byte code.

A third-party application 10 or a Java launcher 20 is used to initiate the JVM, and to load a primary library file, the JVM Dynamic link library (DLL) 30. This in turn loads other DLLs such as the secondary DLLs 40 and 60, and other configuration files such as the secondary 'config' file 50. In a similar way the secondary DLL 60 may in turn load other DLLs and configuration files, such as the tertiary DLL 70. Each of the above files in the JVM installation has a digital signature attached to it. Digital signatures are well known and well documented.

Binary files that will not be altered after installation, such as executables (.exe) and libraries (including the JVM DLL 30 and the secondary and tertiary DLLs 40, 60 and 70) will be digitally signed by the originating software house (or other trusted organisation). The signature will be stored in each binary file itself, in a manner well documented and well known in the art. The exact mechanism will depend upon the format of the file and how it is loaded by the operating system (OS). This is so that adding the signature does not invalidate the binary file and prevent it being loaded by the OS.

Configuration files such as the secondary config file 50 may be altered by the JVM administrator after installation (e.g., 'java.security', 'java.policy'), and these configuration files have a digital signature which can be updated by the administrator using the administrator's private key. The JVM is shipped with a utility which may be used by the JVM administrator to sign all configuration files using their own private key.

Figure 2:
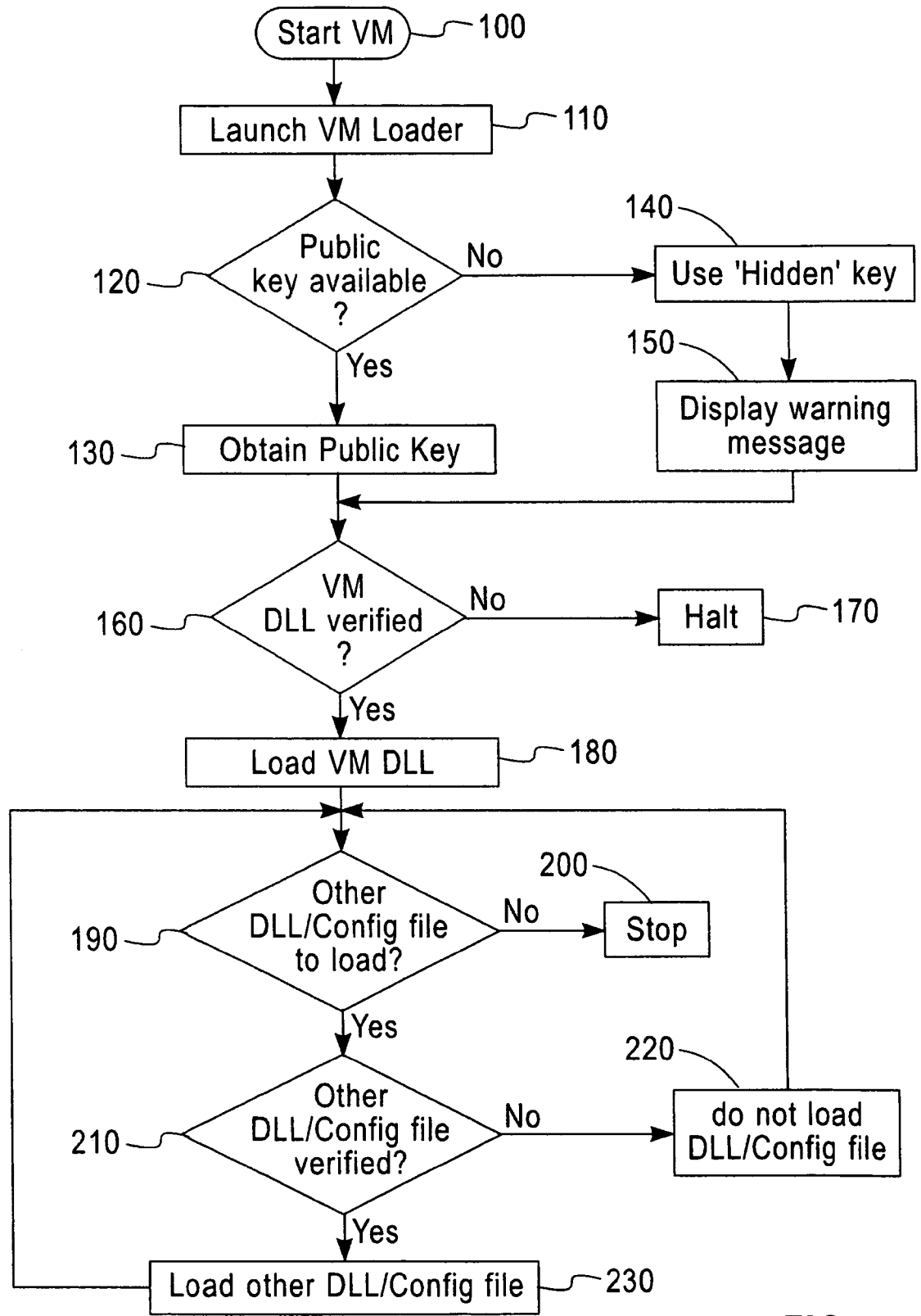

Referring now also to FIG. 2, the verification process starts at box 100. At box 110, a JVM loader is launched. This may be either the Java launcher 20 or indirectly via a Java Native Interface (JNI) under the control of the third party application 10. Verification is similar in both situations; the verification of a JVM loaded by the launcher 10 will be described first.

The launcher application (Java launcher 20 or third-party application 10) seeks to obtain the JVM public key (to validate the signatures) from the internet site of the JVM provider, at box 120. If available, this is obtained (box 130). If the public key is not available a "hidden" copy of the key stored inside of the launcher is used (box 140) and a warning message printed to the screen (box 150). This allows for JVMs being used off line or behind fire walls, etc.

Whether obtained publicly (box 130) or from within the launcher (box 140), the public key is then used to verify the signature on the JVM DLL (box 160). If this is verified, the JVM DLL is loaded and control passed to it (box 180). If it is not verified, the JVM halts (box 170).

Once successfully verified, it is the responsibility of the JVM DLL to verify and load the secondary DLLs and configuration files used by the system, including the secondary DLL and config files 40, 50 and 60. At box 190, the JVM DLL looks for other files to load. If there are none, loading stops (box 200).

If there is another DLL or config file to load (such as the secondary DLL 60, the JVM DLL verifies the digital signature of that file (box 210) against the public or private key, by calling back to the JVM launcher 20. If the signature is not verified, that file is not loaded (box 220), and the JVM DLL continues with other required DLLs or config files (box 190), verifying each file in turn and only loading each file if verified successfully.

If the signature is verified, the file is loaded (box 230) and the JVM DLL continues with other required DLLs or config files (box 190), verifying each file in turn and only loading each file if verified successfully.

It will be understood that this "cascade" approach to verification can be used by subsequent DLLs loaded by the JVM DLL. Therefore once the JVM DLL has loaded all possible files, loaded DLLs such as the secondary DLL 60 may then seek to verify and launch other files. For example, the secondary DLL 60 may verify other files that it calls, following the procedure in boxes 190 to 230. In this way the secondary DLL 60 will verify the tertiary DLL 70, again calling back to the JVM launcher 20 to obtain the public key.

In the case of a virtual machine loaded via the JNI interface, for example by the third-party application 10 making a call to 'JNI_CreateJavaVM', the 'java/javac/.' launcher stage (box 110) will be bypassed. To allow the virtual machine to perform verification under these circumstances the third party developer can request a binary module from the JVM supplier to link into their application. This module will acquire the public key and verify the JVM DLL before loading using the same mechanism as described above.

It will be appreciated that the method described above for verification of the authenticity of a JVM using digital signatures will typically be carried out in software running on a processor (not shown), and that the software may be provided as a computer program element carried on any suitable data carrier (also not shown) such as a magnetic or optical computer disc.

It will be understood that the scheme for verification of the authenticity of a JVM using digital signatures described above provides the following advantages:

1. Firstly, the above arrangement provides enhanced security of the JVM.
2. Secondly, a user has greater confidence that Java applications will function correctly.
3. Furthermore, the detection of incorrect or damaged JVM installations is improved.

It will be appreciated that alternative embodiments to that described above are possible. For example, the order in which files other than the JVM DLL are loaded may differ from that described above. Furthermore, it will be appreciated that this invention is not limited to Java Virtual machine installations per se, but may find application in other similar software environments.

What is claimed is:

1. A system for verification and installation of a virtual machine, comprising:
    a processor:
    a primary library file, the primary library file having a digital signature, wherein the primary library file is a virtual machine dynamic link library file;
    a loader program that, when operated by the processor, checks for a public key from a virtual machine provider to use as a digital signature key and, if the digital signature of the primary library file is verified against the digital signature key, further loads the primary library file, wherein, if the public key cannot be obtained via the virtual machine provider, the digital signature key is a hidden public key internal to the loader program and, if the public key can be obtained via an internet site of the virtual machine provider, the digital signature key is the public key obtained via the virtual machine provider; and a plurality of secondary files referenced by the primary library file, each of the plurality of secondary files having a digital signature;

wherein the loader program verifies and selectively loads the primary library file by comparing the obtained digital signature key with the digital signature of the primary library file, the primary library file subsequently verifying and selectively loading the plurality of secondary files by calling the loader program to compare the obtained digital signature key with the digital signature of each of the plurality of secondary files, at least one tertiary file referenced by at least one secondary file of the plurality of secondary files, wherein after successful verification and selective loading of the at least one secondary file, the at least one secondary file manages the verification and selective loading of the at least one tertiary file, at least one administrator-configurable file and the digital signature key comprising a number of keys including a private key provided by an administrator, wherein the loader program verifies the digital signature of the at least one administrator-configurable file using the private key, wherein the at least one administrator-configurable file includes at least one of a security file and a policy file that is updatable by use of the private key, wherein authenticity of each element of a virtual machine installation is verified.

2. A method for verification and installation of a virtual machine comprising:

launching a loader program operated by a processor and arranged to load library files;

checking for an availability of a public key from an internet site of a virtual machine provider;

if the public key is available from the internet site of the virtual machine provider, using the public key as a digital signature key;

if the public key is not available from the internet site of the virtual machine provider, using a hidden public key stored inside the loader program as the digital signature key;

using the loader program to verify authenticity of a digital signature incorporated in a primary library file by comparing said digital signature with the digital signature key, wherein the primary library file is a virtual machine dynamic link library file;

selectively loading the primary library file in dependence upon the successful verification of its digital signature;

for each of a plurality of secondary files, using the primary library file to verify authenticity of a digital signature incorporated in corresponding one of the plurality of secondary files by calling the loader program to compare the digital signature incorporated in the corresponding one of the plurality of secondary files with the digital signature key; and, selectively loading the plurality of secondary files in dependence upon the successful verification of their digital signatures, including at least one tertiary file referenced by at least one secondary file of the plurality of secondary files, after successful verification and selective loading of the at least one secondary file, using the at least one secondary file to manage the verification and selective loading of the at least one tertiary file, at least one administrator-configurable file and the digital signature key comprising a number of keys including a private key provided by an administrator, wherein the loader program further verifies the digital signature of the at least one administrator-configurable file using the private key, wherein the at least one administrator-configurable file is loaded upon successful verification of any corresponding digital signatures, wherein the at least one administrator-configurable file includes at least one of a security file and a policy file that is updatable by use of the private key, wherein authenticity of each element of a virtual machine installation is verified.

3. The system for verification and installation of a virtual machine of claim 1, further characterised by: the virtual machine provider is accessed through an internet site to provide the public key.

4. The method for verification and installation of a virtual machine of claim 2, further characterised by: the virtual machine provider is accessed through an internet site to provide the public key.

5. The system for verification and installation of a virtual machine of claim 1, wherein the loader program is a third-party application that initiates the virtual machine installation.

6. The system for verification and installation of a virtual machine of claim 1, wherein the loader program is a virtual machine launcher that initiates the virtual machine installation.

7. The method for verification and installation of a virtual machine of claim 2, wherein the loader program is a third-party application that initiates the virtual machine installation.

8. The method for verification and installation of a virtual machine of claim 2, wherein the loader program is a virtual machine launcher that initiates the virtual machine installation.

9. A system for verification and installation of a virtual machine comprising:

a processor;

a virtual machine primary library file, the virtual machine primary library file having a digital signature;

a loader program that, when operated by the processor, checks for a public key from a virtual machine provider to use as a digital signature key and, if the digital signature of the primary library file is verified against the digital signature key, further loads the virtual machine dynamic link library file; and a plurality of secondary files referenced by the virtual machine primary library file, each of the plurality of secondary files having a digital signature;

wherein the loader program verifies and selectively loads the virtual machine primary library file by comparing the obtained digital signature key with the digital signature of the virtual machine primary library file, the virtual machine primary library file subsequently verifying and, if the digital signature of the primary library file is verified against the digital signature key, loading the plurality of secondary files by calling the loader program to compare the obtained digital signature key with the digital signature of each of the plurality of secondary files, wherein, if the public key cannot be obtained via the virtual machine provider over the internet, the digital signature key is a hidden public key internal to the loader program and, if the public key can be obtained via an internet site of the virtual machine provider, the digital signature key is the public key obtained via the virtual machine provider over the internet;

at least one tertiary file referenced by at least one secondary file of the plurality of secondary files, wherein after successful verification and selective loading of the at least one secondary file, the at least one secondary file manages the verification and selective loading of the at least one tertiary file; at least one administrator-configurable file; and the digital signature key comprising a number of keys including a private key provided by an administrator, wherein the loader program verifies the digital signature of the at least one administrator-configurable file using the private key, wherein the at least one administrator-configurable file includes at least one of a security file and a policy file that is updatable by use of the private key, wherein authenticity of each element of a virtual machine installation is verified.

10. The system for verification and installation of a virtual machine of claim 5, wherein the third-party application launches the loader program through a native interface.

11. The method for verification and installation of a virtual machine of claim 7, wherein the third-party application launches the loader program through a native interface.

12. The system for verification and installation of a virtual machine of claim 10, wherein a binary module is linked into the third-party application and performs verification.

13. The method for verification and installation of a virtual machine of claim 11, further comprising linking a binary module into the third-party application, the binary module performing verification.

* * * * *